United States Patent [19]

Bowman

[11] 3,912,139
[45] Oct. 14, 1975

[54] REMOVABLE VEHICLE MOUNTED CYCLE CARRIER

[76] Inventor: Jimmy W. Bowman, 1433 W. Princeton, Ontario, Calif. 91762

[22] Filed: Jan. 17, 1974

[21] Appl. No.: 434,138

[52] U.S. Cl......... 224/29 R; 224/42.45 R; 105/497; 211/22; 248/119 R
[51] Int. Cl.²......................................... B60R 9/10
[58] Field of Search............... 224/29 R, 29.5, 42.32, 224/42.45 R; 296/1 A; 214/450, 515, 83.25; 105/369 B, 368 R, 370, 371, 497, 499, 502; 248/119; 211/17, 18, 19, 20, 21, 22

[56] References Cited
UNITED STATES PATENTS

| | | | |
|---|---|---|---|
| 745,170 | 11/1903 | Eppley...................... | 105/369 B UX |
| 891,897 | 6/1908 | Astrom...................... | 105/369 B UX |
| 3,447,826 | 6/1969 | Gostomski.................... | 293/73 X |
| 3,675,795 | 7/1972 | Dluhy........................ | 248/119 UX |
| 3,687,318 | 8/1972 | Casey........................ | 214/450 |
| 3,720,333 | 3/1973 | Vaughn....................... | 214/450 |
| 3,785,517 | 1/1974 | Brajkovich................... | 214/450 |

FOREIGN PATENTS OR APPLICATIONS

| | | | |
|---|---|---|---|
| 307,616 | 5/1933 | Italy......................... | 211/22 |

Primary Examiner—Robert J. Spar
Assistant Examiner—Jerold M. Forsberg
Attorney, Agent, or Firm—Clarence A. O'Brien; Harvey B. Jacobson

[57] ABSTRACT

A cycle carrier for mounting upon the flat bed of a truck, trailer or van which has longitudinally extending, upstanding, substantially parallel side walls along the sides of the bed comprises longitudinally extending, upwardly opening channel-shaped members having a slot in the web thereof for receiving the front wheel of a motorcycle with the rear wheel of the motorcycle received on the web of and constrained within the walls of the channel member. At least two transversely extending runners support the channels on the bed and engage the truck side walls to secure the channels in place. Preferably, the runners are slidable in sleeves depending from the channel members. On one end of each runner is a length adjusting means including a threaded shank received within a threaded receptacle on the end of the runner. Frictional and compressible side wall engaging means are disposed on the end of the shank remote from the runner.

15 Claims, 6 Drawing Figures

REMOVABLE VEHICLE MOUNTED CYCLE CARRIER

The increasing use of motorcycles for off-the-road trail riding and other sporting, recreational and vacation activities has created a need for the development of cycle carrying devices. Heretofore, virtually all such devices were designed to carry the cycles in various positions on automobile bodies utilizing racks to mount the cycles to the vehicles. Presently, with the increase in popularity of pick-up trucks and the convenience and efficiency associated with transporting more than one cycle at a time, there has emerged a need for a motorcycle carrier which can securely mount a number of cycles on the flat beds of trucks.

Accordingly, it is an object of the present invention to provide a motorcycle carrier particularly adapted for use in conjunction with flat bed vehicles having substantially parallel, lengthwise extending side walls (e.g., pick-up trucks).

It is another object of this invention to provide a cycle carrier which is simple and lightweight in construction and which can mount a number of cycles at the same time, all in an upright position.

It is still another object of the invention to provide a cycle carrier which is adjustable to fit within virtually any size pick-up truck, van, utility trailer and similar flat bed vehicle, without need to alter the vehicle such as by drilling holes, mounting hinges or clamps, or the like.

Other objects and advantages will become apparent from the following description and appended claims taken in conjunction with the accompanying drawings.

Figure 1:
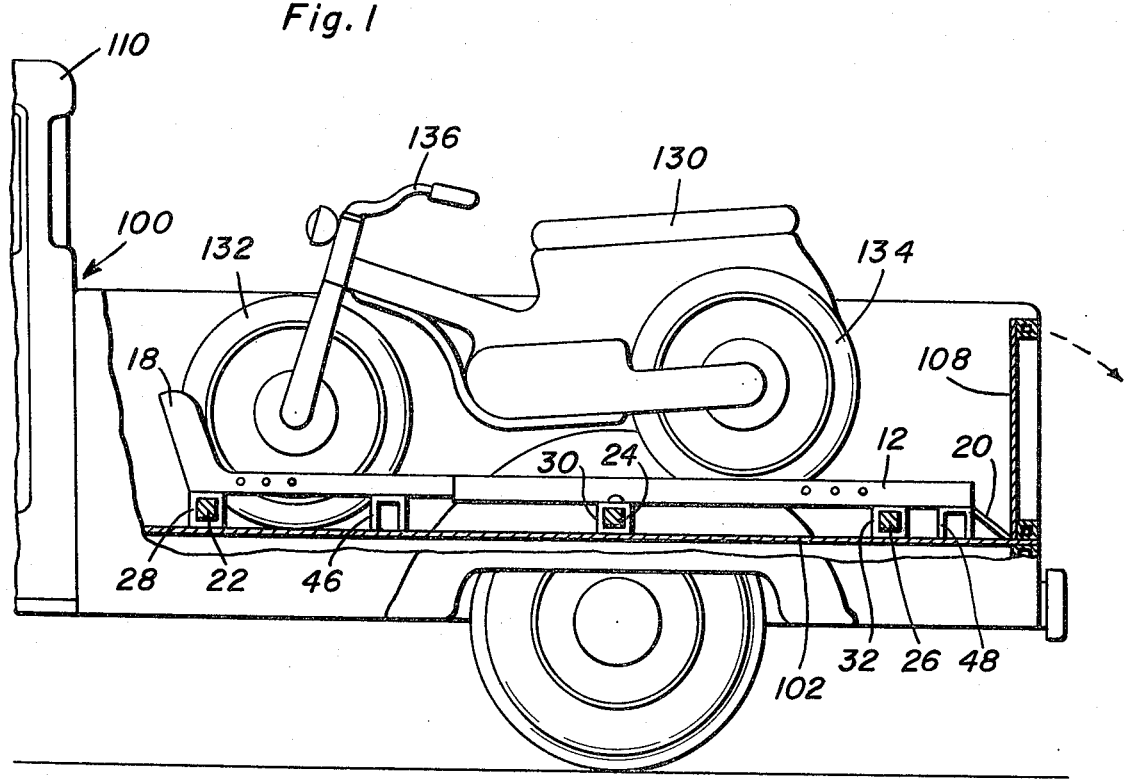
FIG. 1 is a side elevational view of a pick-up truck, with one side wall partially broken away, showing the cycle carrier of the present invention secured on the truck bed with a cycle mounted in an upright position on the carrier.
Figure 2:
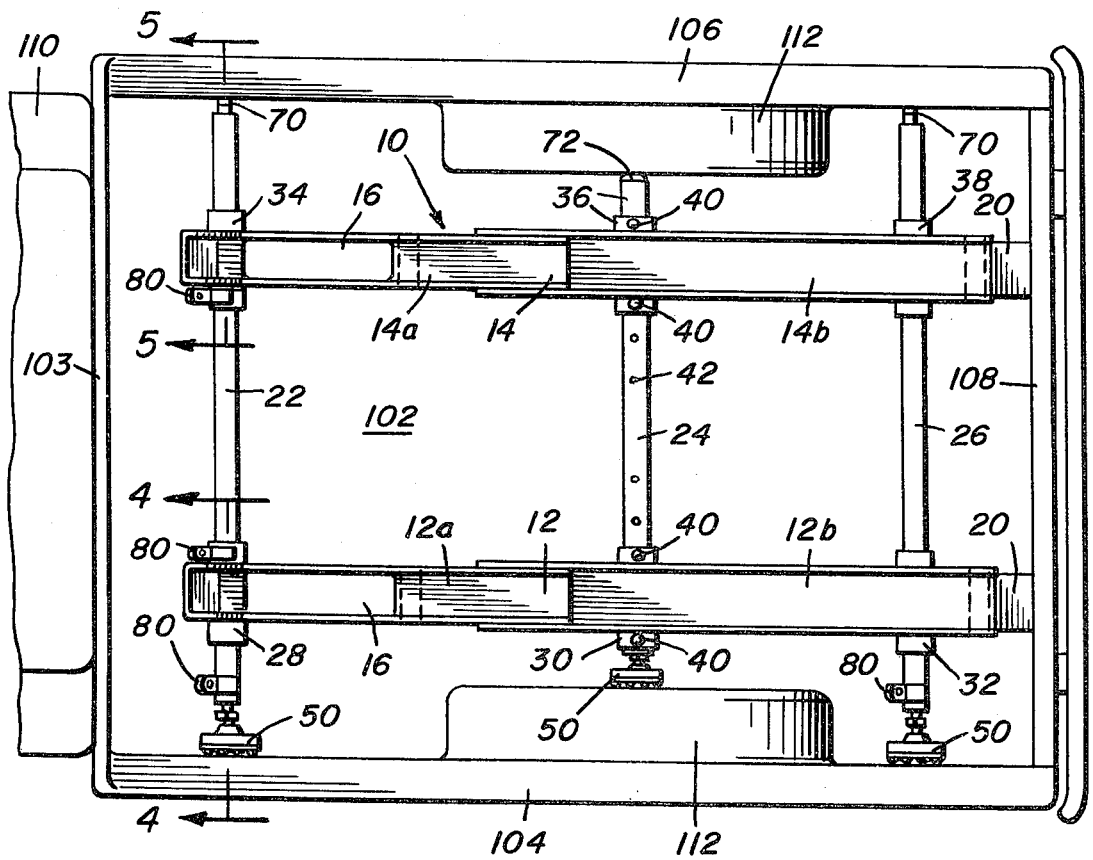
FIG. 2 is a plan view of a two motorcycle carrier of the present invention secured in the load carrying compartment of a conventional pick-up truck.
Figure 3:
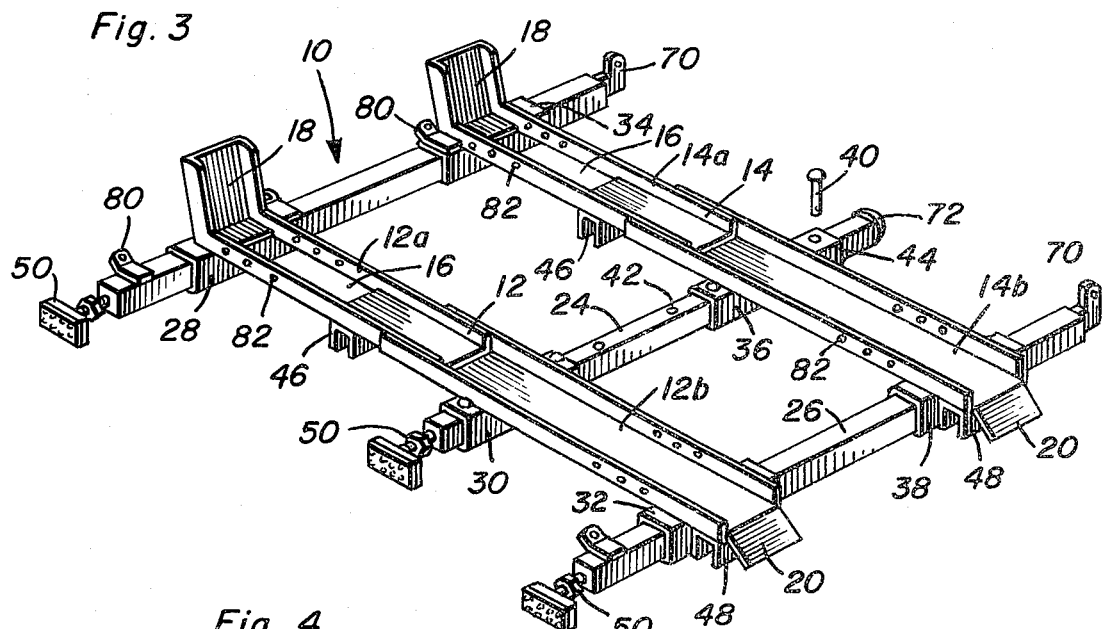
FIG. 3 is a perspective view of the two motorcycle carrier of the present invention.

Referring now to the drawings and particularly to FIGS. 1-3, there is shown generally at 10 one embodiment of the motorcycle carrier of the present invention supported on the flat bed 102 of a pick-up truck 100 between the upstanding side walls 104, 106 of the truck. It will be appreciated that carrier 10 can be used in conjunction with any flat bed vehicle having substantially parallel side walls, such as a van, utility trailer, and the like. However, for convenience of description, cycle carrier 10 will be herein described solely in association with a conventional pick-up truck. Pick-up truck 100 consists essentially of a cab 110 and a bed 102. The bed is bordered on its front and sides by substantially parallel upstanding front and side walls 103, 104 and 106, and on the rear by hinged gate 108 which can swing rearwardly and downwardly from the upstanding position shown in FIG. 1 in the direction indicated by the arrows. Front wall 103 is immediately adjacent the rear of cab 110. As can be seen in FIG. 1, motorcycle 130 mounts on carrier 10 in an upright position with the front and rear wheels 132 and 134 supported on the carrier.

Carrier 10 is positioned on bed 102 in such a manner that cycles 130 are preferably oriented with their front wheels 132 facing cab 110 and their rear wheels 134 remote from cab 110, i.e., the cycles are mounted generally parallel to side walls 104 and 106. Of course, the cycle orientation could be changed if desired. Carrier 10 is held securely in position on bed 102 by bracing it, in a manner to be hereinafter described, between side walls 104 and 106. Inasmuch as most pick-up trucks contain fender wells 112 disposed approximately midway between front wall 103 and gate 108, it has been found convenient to brace the carrier between the fender wells also. In the event there are no fender wells, then the carrier would be braced only between the side walls of the vehicle.

Carrier 10, in the embodiment of FIGS. 2 and 3, consists of two generally parallel, longitudinally extending upwardly opening channel or U-shaped members 12, 14 for supporting the front and rear wheels of a cycle on each. Each channel member has formed in the web thereof a longitudinally extending slot 16 adjacent the front end of the member for receiving the front wheel of the cycle. It will be appreciated that the length of slot 16 should be less than the diameter of the front wheel 132 of the cycle to be supported yet sufficiently long to preferably permit wheel 132 to contact and be supported directly on bed 102. Channel members 12, 14 are preferably formed in two sections, front sections designated 12a and 14a respectively and rear sections designated 12b and 14b respectively. Channel sections 12a and 14a are so dimensioned that they snugly nest within channel sections 12b and 14b and are slidable therein to enable adjustment of the overall length of each channel member. Each channel member terminates at its forward end with a forwardly inclined channel-shaped shoe member 18 for supporting the front of wheel 132 when the wheel is disposed in slot 16. Shoe member 18 acts as a stop and constrains the cycle against forward movement. At its rear end, each channel member 12, 14 terminates in a ramp 20 which inclines rearwardly and downwardly into contact with bed 102. If desired, the ramp may be hinged (not shown) at its juncture with the channel member. Preferably, carrier 10 is oriented on bed 102 such that the intersection of ramp 20 with bed 102 is immediately adjacent gate 108.

Channel members 12 and 14 are supported on bed 102 between side walls 104 and 106 and fender wells 112 by transversely extending runners or brace members 22, 24 and 26 (which are preferably hollow rectangular bar stock) which rest directly on the bed and include means at their outer ends for securely engaging the side walls and fender wells. The runners extend through transversely oriented sleeve members (which are preferably box channel sections) 28, 30 and 32 welded or otherwise affixed to the underside of channel member 12 and sleeve members 34, 36 and 38 affixed to the underside of channel member 14 such that channel members 12, 14 are slidable on the runners in a direction generally perpendicular to the side walls. In this manner, the position of the channel members may be adjusted relative to the side walls of the vehicle. Once the position of each channel member has been determined, the channels are secured in place with headed pins 40. More specifically, runner 24 includes a plurality of upwardly opening apertures 42 along its length which can be alined with apertures 44 in sleeve members 30 and 36. Pins 40 are inserted through the alined apertures to secure each channel member in position relative to the side walls. Each channel member may also include support members 46 and 48 (preferably inverted U-channel sections) disposed along its length between bed 102 and the underside of the channel member. In the embodiment of FIGS. 2 and 3, support member 46 is welded or otherwise affixed to the underside of each of sections 12a and 14a and support member 48 is welded or otherwise affixed adjacent ramp 20 to the underside of each of sections 12b and 14b.

Figure 4:
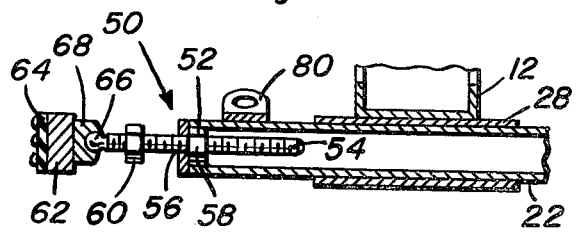
FIG. 4 is a partial sectional view taken substantially along line 4—4 in FIG. 2.

Runners 22, 24 and 26 are adjustable in length to allow them to be secured on the bed of virtually any size vehicle. Preferably, the length adjustments are made at only one end of each runner, although it will be understood that the adjustment could be made at both ends, if desired. For the embodiment of FIGS. 2 and 3, the length adjusting mechanism 50 is shown most clearly in FIG. 4. Mechanism 50 comprises a shank 52 having external threads 54 thereon received within an opening 56 in one end of runner 22. An internally threaded nut 58 constrained against rotation is disposed within runner 22 to permit one end of threaded shank 52 to threadably move into and out of runner 22 and thereby to adjust its length. It will be appreciated that opening 56 can itself be threaded and nut 58 omitted entirely. A locknut 60 is threaded onto shank 52 to lock the shank in position at the desired adjusted length of the runner. Mounted on the end of the shank remote from the runner is a side wall or fender well engaging means consisting of a generally rectangular body 62 having a wall engaging pad 64, which may be of rubber, plastic or other suitable material, on its planar face adjacent the wall. Pad 64 is preferably of a compressible material which is textured (such as by dimpling, ribbing or the like) to frictionally engage the side wall or fender well of the vehicle. To insure firm engagement of the pad 64 with the wall of the vehicle it is desirable that the connection between the shank 52 and body 62 be universal. To that end a ball 66 is provided at the end of the shank adapted to engage a socket 68 on body 62. As shown in FIGS. 2 and 3, length adjusting mechanisms 50 are carried by one end of each of runners 22, 24 and 26.

Figure 5:
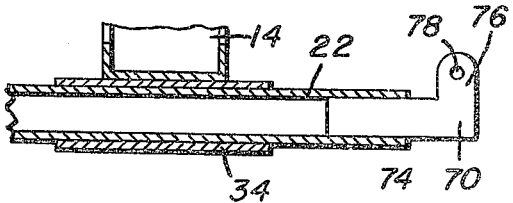
FIG. 5 is a partial sectional view taken substantially along line 5—5 in FIG. 2.

The other end of each of the runners carries either a L-shaped tie-down 70 or a plastic or rubber bumper 72. Where a tie-down 70 is used (see FIG. 5), the horizontal portion 74 of the L is inserted within the end of the runner while the vertically upstanding portion 76 of the L encloses the eye ring 78. If desired, tie-down eye 70 can be utilized to adjust the length of the runner in which it is housed by so dimensioning horizontal portion 74 that it is slidable within the runner, extending the tie-down outwardly from the end of the runner and securing it in position using a setscrew or pin (not shown) projecting through the runner wall into contact with horizontal portion 74. In addition, if desired, a bumper or pad (not shown) can be applied to the face of the vertical portion 76 of the tie-down 70 in contact with the side wall or fender well.

To mount a cycle 130 on one of the channel members 12, 14, the cycle is pushed up ramp 20 with the wheels riding on the channel web within the channel walls until the front wheel 132 slips into slot 16 with its front end contacting support shoe 18. Adjustable tie-down straps (not shown), as are well known (e.g., rubber, plastic or fabric straps), are then extended between tie-down points on the cycle and tie-downs 70 or selected tie-down eye rings 80 located at various points along carrier 10. For example, rings 80 are provided on runners 22 and 26 and on sleeves 28 and 34. In addition, holes 82 for tie-down straps are formed in the wall portions of channels 12 and 14. It will be appreciated that the location of rings 80 and holes 82 is not critical and can vary depending upon the size and weight of the cycle to be carried as well as upon personal preference in tie-down techniques.

Figure 6:
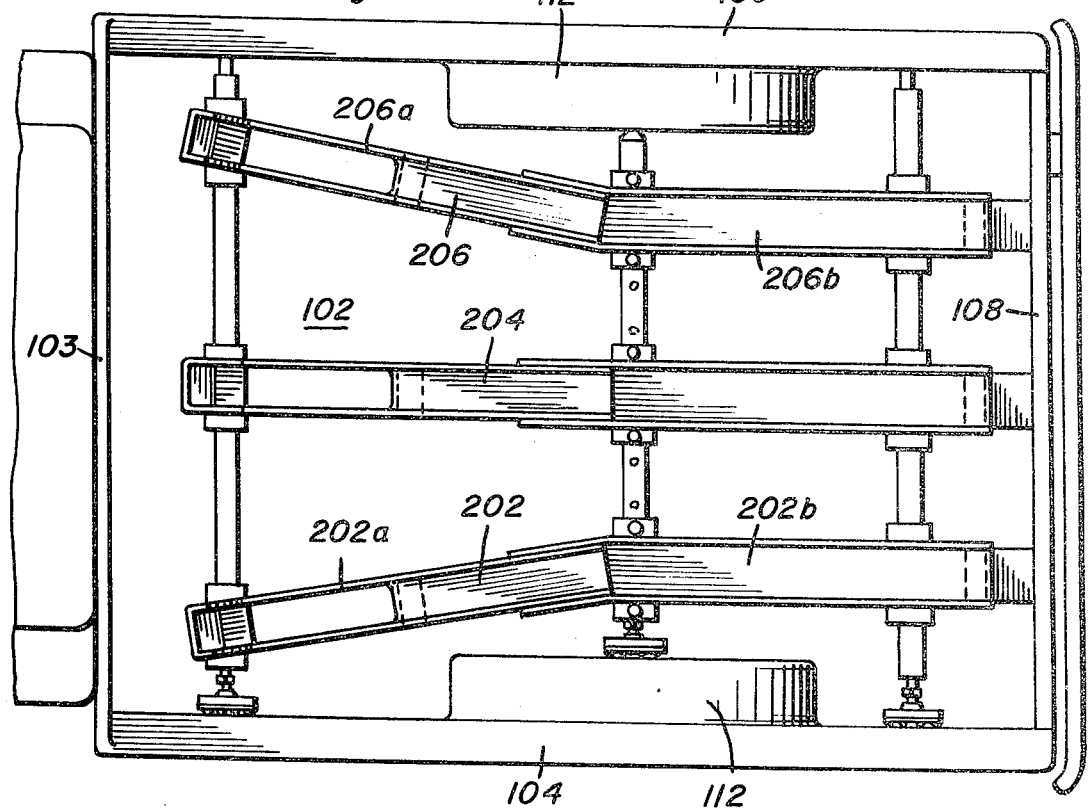
FIG. 6 is a plan view of a three motorcycle carrier of the present invention secured in the load carrying compartment of a conventional pick-up truck.

FIG. 6 depicts a three-cycle carrier embodiment 200 of the carrier of the present invention. Except for the configuration of the flanking channels 202 and 206, the essential structural features of embodiment 200 are substantially the same as the features of embodiment 10. Specific tie-down rings and hole locations (not shown on FIG. 6) will of course differ from those of FIG. 2 but should be situated in generally the same locations. With respect to channels 202 and 206, it will be noted that in order to fit three cycles on bed 102, it is necessary to incline the front portions of the flanking channels sidewardly toward the side walls 104 and 106. It is preferred that the sideward inclination angle be formed in the rear sections 202b and 206b of the channels and that their front sections 202a and 206a remain as straight sections. This facilitates adjusting the overall length of the channels. When mounting the cycles on channels 202 and 206, it is necessary to turn the handle bars 136 of the cycles toward the side walls of the vehicle to enable the front wheels 132 to be seated in the slots 16. Rear wheels 134 rest on the web and are constrained by the side walls of the rear sections of the channel members, as was the case with carrier 10.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A cycle carrier for mounting upon a flat bed having longitudinally extending, upstanding, substantially parallel side walls, said carrier comprising:
   a. at least one longitudinally extending, longitudinally extensible, elongated, upwardly opening, generally U-shaped member having an upturned portion at one end thereof said member comprising upstanding side portions and a web portion connecting said side portions for receiving the wheels of a cycle thereon, said member supported on said bed and including a longitudinally extending slot in the web portion of said U-shaped member adjacent said upturned end portion, said slot having a length less than the diameter of the cycle front wheel for receiving a portion of said front wheel therein and cooperating with said upturned end portion to support the front wheel of said cycle;
   b. at least two transversely extending sleeve members spaced apart along the length of and depending from each said wheel receiving member to space said wheel receiving members from said bed;

e. elongated, generally parallel, transversely extending brace members projecting through and slidable in said sleeve members and engaging said side walls for adjustably securing said wheel receiving member against longitudinal movement in said bed;

d. means for adjustably securing said wheel receiving member against lateral movement along said brace members relative to said side walls; and e. length adjusting and frictional wall engaging means on at least one end of each said brace member, said length adjusting means comprising a shank extending from one end of said brace member and movable toward and away from said side wall and said wall engaging means disposed on the end of said shank remote from said brace member.

2. A carrier, as claimed in claim 1, wherein said shank is threaded and is received within a threaded receptacle in the end of said brace member.

3. A carrier, as claimed in claim 2 including means on said shank for locking said shank in position after said brace member has been threadably adjusted to the desired length.

4. A carrier, as claimed in claim 2 wherein the connection between said shank and said wall engaging means is a universal connection.

5. A carrier, as claimed in claim 4, including a ball on the end of said shank remote from said brace member, and wherein said wall engaging means includes socket means for receiving said ball.

6. A carrier, as claimed in claim 4, wherein said wall engaging means comprises a body having at least two generally parallel faces, a frictional, wall engaging pad on one of said faces and means for universally coupling said shank to said body on the other of said faces.

7. A carrier, as claimed in claim 1, including at least one transversely extending support member depending from said wheel receiving member into contact with said bed.

8. A carrier, as claimed in claim 1, wherein said wheel receiving member comprises first and second sections, one end of said first section nesting and longitudinally slidable within the adjacent end of said second section for adjusting the length of said U-shaped member.

9. A carrier, as claimed in claim 8, wherein each section is secured by at least one of said brace members.

10. A carrier, as claimed in claim 9, including at least two substantially parallel U-shaped members.

11. A carrier, as claimed in claim 10, including two generally parallel U-shaped wheel receiving members and three generally parallel elongated brace members, each said U-shaped member having first, second and third longitudinally spaced apart sleeve members depending therefrom.

12. A carrier, as claimed in claim 11, further including at least two transversely extending support members depending from each said U-shaped member into contact with said bed.

13. A carrier, as claimed in claim 12, including inclined ramp means depending from the end of each said U-shaped member remote from said upturned portion.

14. A carrier, as claimed in claim 13, wherein said means for adjustably securing said wheel receiving members against lateral movement comprises at least one aperture in one of said sleeves depending from each wheel receiving member a plurality of apertures in said brace member passing through said apertured sleeve alignable with said aperture in said sleeve as said brace member slides in said sleeve, and pin means passing through aligned apertures in said sleeve and said brace member to prevent further relative slidable movement therebetween.

15. A carrier, as claimed in claim 11, including three generally parallel U-shaped members, the end which includes said upturned portion of each of said two flanking U-shaped members inclined at an angle away from said central U-shaped member toward the adjacent side wall.

* * * * *